3,366,590
FILM-FORMING BLOCK COPOLYMERIC
EMULSIONS
David Taft, Minneapolis, Minn., assignor to Ashland Oil & Refining Company, Ashland, Ky., a corporation of Kentucky
No Drawing. Continuation-in-part of application Ser. No. 423,376, Jan. 4, 1965. This application Jan. 14, 1966, Ser. No. 520,629
11 Claims. (Cl. 260—29.6)

ABSTRACT OF THE DISCLOSURE

This invention relates to a novel process of interpolymerizing four classes of monomers: (1) hydroxyl-free aliphatic ester of $\alpha,\beta$-unsaturated monocarboxylic acid; (2) aliphatic ester of $\alpha,\beta$-unsaturated monocarboxylic acid wherein the aliphatic portion contains a free or unreacted hydroxyl group, (3) copolymerizable monovinyl compound; and (4) $\alpha,\beta$-unsaturated mono- or dicarboxylic acid or salt thereof, or a monoester of a dicarboxylic acid or salt thereof. The monovinyl compound has a $T_g$ such that by itself it forms a hard polymer. The monomers are polymerized in two stages, the hard monomer predominating the second stage.

---

This is a continuation-in-part of Ser. No. 423,376, filed Jan. 4, 1965, now Patent No. 3,297,621.

This invention relates to emulsions which can form tack free, clear, high gloss, mar resistant, adherent, flexible, water and caustic resistant cured films. In a second aspect, this invention relates to these cured films, which can be both supported and free. In still another aspect, this invention relates to a novel process of interpolymerizing four classes of monomers: (1) hydroxyl-free aliphatic ester of $\alpha,\beta$-unsaturated monocarboxylic acid; (2) aliphatic ester of $\alpha,\beta$-unsaturated monocarboxylic acid wherein the aliphatic portion contains a free or unreacted hydroxyl group; (3) copolymerizable monovinyl compound; and (4) $\alpha,\beta$-unsaturated mono- or dicarboxylic acid or salt thereof, or a monoester of a dicarboxylic acid or salt thereof.

The general concept of combining copolymerizable monomers to prepare film-forming copolymers (in emulsion form) is already well known. One standard preparation of copolymeric emulsions employs a delayed addition of a single mixture of all the copolymerizable monomers to an aqueous solution containing suitable dispersing aids. The copolymerization is conducted in the presence of an appropriate catalyst. Since this reaction is conducted near the reflux temperature through the controlled addition of the monomers, this type of polymerization is known as a reflux emulsion copolymerization. If this same copolymerization reaction is initiated in the additional presence of a catalyst reducing agent, a redox emulsion copolymerization results. In this latter case, the increased efficiency of the redox system does not require external heating since the reaction produces a vigorous exotherm which completes the copolymerization.

I have discovered that by dividing the four monomers into two separately added charges (hereinafter referred to as Premix A and Premix B) and by controlling the make-up of each charge, a block copolymeric emulsion can be produced which is distinctively different from copolymeric emulsions prepared by simultaneously reacting a single mixture of the same monomers present in the same proportions. With certain selected monomers, I am able to form copolymeric emulsions which, when cast in film form on a suitable substrate at room temperature, form a continuous film. Such a film can then be cured by air drying at room temperature to thereby form a clear, high gloss, mar resistant, adherent, flexible film. Baking these films increases the hardness, and improves the water and caustic resistance. The emulsions of the present invention (with and without pigments, flow control agents and the like) are useful in forming films (protective or decorative films) on a variety of substrates, e.g., wood, metal, paper, paper board, etc. Further, unsupported or free films can also be formed from my copolymeric emulsions.

The unique nature of the copolymeric emulsions of my invention can be demonstrated by comparing the glass transition temperature ($T_g$) and/or the minimum film formation temperature (MFT) of one of my block copolymeric emulsions with the same values obtained for a copolymeric emulsion prepared by conventional techniques from exactly the same monomers in exactly the same proportions. I have observed that the minimum film formation temperature of my block copolymeric emulsion is less than that of the conventional copolymeric emulsions. In addition, my process produces a lower viscosity emulsion when compared to conventional processes.

The difference between my block copolymeric emulsions and the prior art emulsions can be repeatedly demonstrated by selecting monomers of the herein defined classes which, on the basis of their glass transition factors (glass transition factors for different monomers are available in published form, e.g., see Table SP-222, dated March 1965, published by Rohm & Haas Company of Philadelphia), should give a copolymer having a minimum film formation temperature slightly above (e.g., 5° above) room temperature. When these monomers are combined by conventional techniques, a continuous cured film cannot generally be prepared at room temperature. Surprisingly, when the same monomers are combined, in the same proportions, by my technique, continuous cured films can generally be obtained by air drying at room temperature. I do not mean to imply that my invention is limited to copolymeric emulsions which will form continuous films on air drying at room temperature. It is not so limited. Rather, it is with these particular emulsions that the differences between my block copolymeric emulsions and the prior art emulsions become so pronounced.

Among the many other advantages of my process are: (1) the ability to incorporate harder monomers into certain copolymeric emulsions without destroying the ability of the emulsions to form continuous films at room temperature; (2) the ability to substantially duplicate the properties of conventional random copolymeric emulsions with my block copolymeric emulsions which have been formulated to include significantly more of the low cost monomers, thereby realizing a significant reduction in cost without sacrificing performance; (3) the ability of some of my copolymeric emulsions to form continuous films at room temperature, which films can be air dried at room temperature; (4) the ability of all of my copolymeric emulsions to be cured by baking, or optionally, by means of common cross-linking resins (e.g., the aminoplast cross-linking resins); and (5) the ability of my copolymeric emulsions to cross link on baking through a variety of mechanisms including esterification of the free hydroxyl group.

In accordance with my invention, liquid phase, catalyzed emulsion polymerization techniques are employed wherein at least four classes (and preferably only four classes) of monomeric substances are employed. The applicable range of quantities of the monomeric substances (based on the combined weight of Premix A and Premix B) are as follows:

(1) 20–90% by weight of hydroxyl-free aliphatic ester of $\alpha,\beta$-unsaturated monocarboxylic acid;
(2) 20–1% by weight of aliphatic ester of $\alpha,\beta$-unsaturated monocarboxylic acid wherein the aliphatic portion contains a free or unreacted hydroxyl group;

(3) 50–8% by weight of copolymerizable monovinyl compound; and (4) 10–1% by weight of $\alpha,\beta$-ethylenically unsaturated mono- or di-carboxylic acid or salt thereof, or monoester of a dicarboxylic acid or salt thereof.

The preferred range of quantities of the monomeric substances are as follows:

(1) 35–75% by weight of hydroxyl-free aliphatic ester of $\alpha,\beta$-unsaturated monocarboxylic acid;

(2) 10–2% by weight of aliphatic ester of $\alpha,\beta$-unsaturated monocarboxylic acid wherein the aliphatic portion contains a free or unreacted hydroxyl group;

(3) 45–107 by weight of copolymerizable monovinyl compound; and (4) 8–3% by weight of $\alpha,\beta$-unsaturated mono- or dicarboxylic acid or salt thereof, or monoester of a dicarboxylic acid or salt thereof.

The monomeric ingredients are divided into a first charge (Premix A) and a second charge (Premix B). Premix A contains the entire quantity (or substantially so) of the hydroxyl-free ester of the $\alpha,\beta$-unsaturated monocarboxylic acid, a portion (usually from 10–95%, e.g., 50–90%) of the hydroxyl-containing ester of the $\alpha,\beta$-unsaturated monocarboxylic acid, a portion (usually from 10–95%, e.g., 50–90%) of the $\alpha,\beta$-unsaturated mono- or dicarboxylic acid or salt (or monoester of a dicarboxylic acid or salt thereof), and approximately 10–80% (e.g., 30–60%) by weight of the monoethylenically unsaturated compound (i.e., the copolymerizable monovinyl compound) which by itself forms a hard polymer.

The remaining monomers form Premix B. It should be noted that it is important for each of the four classes of copolymerizable monomers to be represented by at least one monomer. Thus, the hydroxyl-containing ester can be represented by $\beta$-hydroxyethyl acrylate, only, while the monovinyl compound can be represented by a mixture of styrene and methyl methacrylate. The predominant ingredient in the second charge (i.e., in Premix B) will be the monovinyl compound.

In the preferred method of preparation, Premix A is slowly added at, for example, 160° F., to a previously prepared aqueous emulsifying solution containing suitable dispersing aids (e.g., anionic and/or non-ionic surfactants) and a suitable catalyst. Although the addition temperature for Premix A can range from room temperature to the boiling point of water, experience has shown that temperatures of from 150° to 190° F., more usually from 160° to 180° F., are especially desirable. Temperatures at or near the reflux temperature are quite effective. The pressure employed throughout the entire polymerization process is preferably atmospheric or substantially atmospheric. However, reduced and elevated pressures can also be used, e.g., elevated pressures are desirable if a volatile monomer has been used. An inert atmosphere can also be used. During the addition of Premix A, a moderate rise in temperature to between about 150° to 212° F., more usually from 160° to 205° F., e.g., to 175° to 200° F., is noted. After addition of Premix A has been completed (it usually requires from 1 to 4 hours), it is desirable to cook the mixture at the same temperature for a short period of time (e.g., 1 to 30 minutes). Then, Premix B is added over a short period of time (e.g., 3 to 90 minutes) and the temperature will again rise, frequently to between about 175° to 200° F. At the end of the addition of Premix B, the reactants are then preferably given a heat treatment, generally about ½ to 4 hours, e.g., 2 to 3 hours, at a temperature of between about 140° and 212° F., generally from 160° to 210° F., and more desirably from 180° to 200° F. One effect of this heat treatment is to ensure that the monomers are completely converted to copolymer. The emulsion is then cooled. If necessary, the emulsion will then be neutralized to adjust the pH to about 5–9, e.g., to 6–8 by suitable means such as an ammonia solution or an alkyl amine (e.g., triethyl amine).

Less preferably, a normal redox polymerization can also be used for the preparation of my block copolymeric emulsions. In this case, Premix A is added at room temperature to an aqueous emulsifying solution containing suitable dispersing aids (anionic and/or non-ionic surfactants) and a catalyst. A catalyst reducing agent is then added. An exothermic reaction ensues and the temperature rises to the reflux temperature of the system. After the reaction subsides, Premix B is added and the reaction is continued at 140° to 212° F., preferably at 160° to 185° F., e.g. 165° to 180° F. In this manner, Premix A undergoes a redox emulsion copolymerization while Premix B is copolymerized under reflux conditions. If desired, the reaction mixture can be cooled (e.g., to room temperature) after Premix A has reacted, and Premix B together with additional catalyst and additional catalyst reducing agent can then be added. In this manner, both Premix A and Premix B will undergo a redox emulsion copolymerization. In addition to these two general procedures, other methods of latex emulsion preparation, conventional to the field of emulsion polymerization, may be applied. For example, the monomers can be pre-emulsified in the presence of a portion of the water and surfactants, or a chaser catalyst can be used.

The block copolymeric emulsion just described can be cast in film form on a suitable substrate (e.g., metal) and frequently these films can be air dried at room temperature to thereby form continuous, glossy films. More preferably, the wet films (regardless of their ability to dry at room temperature) are cured by baking, usually at temperatures of from 150° to 400° F., e.g., 200° to 325° F. The resulting baked films display greater hardness, toughness and solvent resistance.

Suitable hydroxyl-free aliphatic esters of $\alpha,\beta$-unsaturated monocarboxylic acids are the various acrylates and methacrylates. Typically, the $C_1$–$C_{18}$ alkyl and $C_1$–$C_{18}$ alkoxyalkyl esters will be employed. Examples of such esters are methyl acrylate, ethyl acrylate, n-propyl acrylate, isopropyl acrylate, n-butyl acrylate, isobutyl acrylate, amyl acrylate, isoamyl acrylate, hexyl acrylate, 2-ethylhexyl acrylate, octyl acrylate, 3,5,5-trimethyl hexyl acrylate, decyl acrylate, lauryl acrylate, dodecyl acrylate, cetyl acrylate, octodecyl acrylate, octadecenyl acrylate, ethyl methacrylate, n-propyl methacrylate, isopropyl methacrylate, butyl methacrylate, n-amyl methacrylate, sec.-amyl methacrylate, hexyl methacrylate, 2-ethylhexyl methacrylate, octyl methacrylate, 3,5,5-trimethylhexyl methacrylate, decyl methacrylate, dodecyl methacrylate, octadecyl methacrylate, butoxyethyl acrylate, butoxyethyl methacrylate, other alkoxyalkyl acrylates or methacrylates, and the like. Mixtures of two or more of these esters can be used, e.g., a mixture of ethyl acrylate and isobutyl acrylate. The methyl, ethyl, butyl and 2-ethyl hexyl esters of acrylic acid and the butyl esters of methacrylic acid are the preferred esters. The acrylates are especially preferred. Because the lower alkyl esters of methacrylic acid (e.g., methyl methacrylate) are such hard monomers, I prefer to use them as part or all of the vinyl monomer (hereinafter defined).

Suitable hydroxyl-containing aliphatic esters of $\alpha,\beta$-unsaturated monocarboxylic acids are those esters having the following characteristic structure:

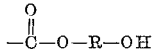

wherein R is an alkylene radical (i.e., a divalent hydrocarbon radical) and contains from 1–8, and more preferably from 1–3, carbon atoms. These esters are typically prepared from acrylic acid, methacrylic acid, and, to a lesser degree, from crotonic acid. Suitable hydroxyl-containing esters include $\beta$-hydroxyethyl acrylate, $\beta$ or $\alpha$-hydroxypropyl acrylate, hydroxy-2-ethyl hexyl acrylate, $\beta$- hydroxyethyl methacrylate, β or α-hydroxypropyl methacrylate, β-hydroxy i-propyl methacrylate, hydroxyoctyl methacrylate, and the like. Mixtures of these esters can be used.

Suitable polymerizable monovinyl compounds are vinyl aromatic compounds such as styrene, α-methyl stryrene, vinyl toluene, the mono-chlorostyrenes, vinyl acetate, vinyl chloride and vinylidene chloride; and alkyl methacrylates having an alkyl group containing 1–5 carbon atoms. Mixtures of these compounds can be used, e.g., a mixture of styrene and methyl methacrylate. Styrene and the alkyl methacrylates are preferred. Styrene is particularly preferred.

Suitable α,β-unsaturated mono- and di-carboxylic acids are methacrylic acid, acrylic acid, crotonic acid, fumaric acid, maleic acid, citraconic acid, and itaconic acid. Monoalkyl esters of these dicarboxylic acids can also be used. In place of the free acids and half-esters, the water soluble salts thereof can be used, including the ammonium salts and the alkali metal salts such as lithium or potassium carboxylates. Mixtures of these various compounds can also be used, e.g., a mixture of acrylic acid and methacrylic acid. Methacrylic acid, acrylic acid, and itaconic acid are preferred.

Either anionic or non-ionic emulsifiers, or a blend of anionic and non-ionic emulsifiers, can be used as dispersing aids in the emulsion preparation. A specific representative non-ionic surfactant useful in emulsion polymerization of the present invention is nonylphenyl polyethylene glycol ether containing 10–12 ethoxy units. However, other surfactants can be selected from the ethylene oxide condensates of long chain fatty acids and alkyl phenols or alcohols. With respect to the anionics, a large group is available from which one or more can be selected: sodium lauryl sulfate; salts of high molecular weight fatty acids and amino soaps; alkali metal salts of straight or branched chain alkyl sulfates, sulfonates, and sulfated dicarboxylic acids; and sodium salts of mono- or disulfonated hydrocarbons and alkaryl sulfonates.

The polymerization catalyst will usually and preferably be one of the following: potassium persulfate, ammonium persulfate, or azo-bis-isobutyronitrile. Other suitable organic catalysts can be employed, alone or in combination with a typical reducing agent. Such reducing agents include sodium hydrosulfite, sodium metasulfite, potassium sulfite, zinc formaldehydesulfoxolate and calcium bisulfite.

Since it is desirable to prepare emulsions having a low viscosity and a high solids content, a chain modifying agent or chain terminator can be added to the polymerization mixture to limit the molecular weight of the block copolymer. The mercaptans such as dodecyl mercaptan, tertiary dodecyl mercaptan, octyl mercaptan, hexyl mercaptan and the like are conventionally used for this purpose. However, other chain modifying agents such as cyclopentadiene, allyl acetate, allyl carbamate and the like may be employed. Use of such chain terminators is common in the polymerization art and is an act within the skill of one routinely engaged in this art.

The present invention will be further understood by reference to the following specific examples, which include a preferred embodiment. Unless otherwise indicated, all parts and percentages are by weight.

*Example I*

Premix A:                                        Parts
    Ethyl acrylate _____ 360
    β-Hydroxypropyl methacrylate _____ 23
    Styrene _____ 98
    Methacrylic acid _____ 12

Premix B:                                        Parts
    β-Hydroxypropyl methacrylate _____ 12
    Styrene _____ 98
    Methacrylic acid _____ 4.5
    Sodium lauryl sulfate _____ 6.3
    Nonylphenyl polyethylene glycol ether (10
        moles of ethylene oxide)[1] _____ 21
    Potassium persulfate _____ 3
    Water _____ 750

[1] Tergitol NPX.

The sodium lauryl sulfate, the glycol ether, and water were mixed in a 2 liter, three-necked flask fitted with a stirrer, thermometer, reflux condenser, and a nitrogen inlet tube. The contents of the flask were sparged with a rapid stream of nitrogen for thirty minutes and then heated to 167° F. During the heat-up of the flask, Premix A was sparged with nitrogen. The potassium persulfate was then added to the flask. Agitation was adjusted to 250 r.p.m. After 5 minutes, the heat was removed and 10% of Premix A was added. An immediate exothermic reaction was observed. After waiting two minutes, the addition of Premix A was again started. The slow addition of Premix A required 2½ hours during which time the temperature rose to 185° F. Five minutes after the addition of Premix A was completed, the addition of Premix B (which had just been sparged for 15 minutes with nitrogen) was started. Premix B was added over a one-half hour period. During this time, the temperature was maintained above 167° F., by the application of heat. After the addition of Premix B was completed, the temperature was increased by heating to 190°–200° F., and held at that level for two hours. An opaque emulsion resulted. The opaque emulsion was then cooled to room temperature and neutralized to a pH of 8.3 with aqueous ammonia (28%). The emulsion had a non-volatile (NV) content of 45% and a viscosity of 90 cps. as measured on a Brookfield RVT viscometer using a number 4 spindle at 100 r.p.m.

A .0015 inch wet film of the emulsion was then cast on glass and allowed to air dry at room temperature for one hour. The dried film was clear, tack free and glossy. The film had a Sward hardness of 18 and exhibited excellent adhesion and flexibility.

A .0015 inch wet film was also cast on tin plate and dried. The tin was amalgamated to obtain a free film. The free film had a tensile strength of 1170 p.s.i. at 170% elongation.

*Examples II–IV*

Examples II–IV were conducted in a manner similar to Example I. The composition of Premix A and Premix B, emulsion properties, and film properties were as shown in the following table:

TABLE

|  | Examples | | |
| --- | --- | --- | --- |
|  | II | III | IV |
| Premix A: | | | |
|   Ethyl Acrylate | 360 | 360 | 357 |
|   Styrene | 98 | 98 | 98 |
|   β-Hydroxyethyl Methacrylate | 21 |  |  |
|   β-Hydroxyethyl Acrylate |  | 18 |  |
|   β-Hydroxypropyl Methacrylate |  |  | 23 |
|   Methacrylic Acid | 12 | 12 | 15 |
| Premix B: | | | |
|   Styrene | 98 | 98 | 98 |
|   β-Hydroxyethyl Methacrylate | 8.5 |  |  |
|   β-Hydroxyethyl Acrylate |  | 7.25 |  |
|   β-Hydroxypropyl Methacrylate |  |  | 12 |
|   Methacrylic Acid | 4.5 | 4.5 | 5 |
| Emulsion Properties: | | | |
|   pH | 8.5 | 8.1 | 7.9 |
|   NV content | 44 | 45 | 45 |
|   Viscosity,* cps | 140 | 80 | 590 |
| Film Properties (0.0015″ wet films dried at room temperature for 24 hours): | | | |
|   Sward Hardness | 18 | 12 | 18 |
|   Tensile Strength, p.s.i. | 1,180 | 754 | 1,710 |
|   Elongation, percent | 230 | 260 | 190 |

*Measured as described in Example I.

From the foregoing examples, it can be seen that the block copolymerization technique of the present invention results in a product having unique film forming properties. Although it need not be used in this manner, my process permits the formation of emulsions yielding room temperature, air-curable (as well as thermosetting) films. Certain emulsions prepared from the same monomer percentages without the unique split-addition technique have been demonstrated not to form continuous cured films at room temperature. Therefore, with my split-addition technique, larger percentages of the cheaper, harder, vinyl compounds can be incorporated into the emulsions than in normal air-curing systems containing the same components. The vinyl monomer imparts hardness, mar resistance, water and caustic resistance to the cured films. The hydroxyl-containing ester of the $\alpha,\beta$-unsaturated carboxylic acid contributes to the dispersibility of the copolymer. More importantly, the latter monomer contributes significantly to the adhesion of the resulting films to any substrate.

The possible uses of the emulsions are numerous. Applications in paper coating areas require a rapidly drying, tack free, flexible film. Textile hand modifiers and nonwoven binders require a high degree of flexibility and adhesion while maintaining good strength properties. Coatings for prefinished lumber require non-blocking, adhesive flexible films. An emulsion copolymer prepared by the split addition technique unlike a random copolymer of the same monomeric composition provides the requirements for these applications: flexibility, tack-free surface, hardness, adhesion, high tensile-elongation, excellent water, caustic, solvent resistance, and gloss.

Having described the present invention with a certain degree of particularity, it will be realized that numerous minor changes and variations, falling within the spirit and scope of this invention, will become obvious to those skilled in the art. It is not intended that this invention be limited to any of the materials which have been mentioned as specific examples nor by any of the specific proportions which have been given for the sake of illustration, but it is intended to claim all novelty inherent in the invention, as well as all obvious modifications and variations thereof

What is claimed is:
1. The method which comprises:
 (a) in a first step, emulsion polymerizing a first mixture of monomers consisting essentially of (1) substantially all of a total of 20–90 parts by weight of a hydroxyl-free aliphatic ester of $\alpha,\beta$-unsaturated monocarboxylic acid or a mixture of such esters, (2) 10%–95% of a total of 1–20 parts by weight of a hydroxyl-containing aliphatic ester of $\alpha,\beta$-unsaturated monocarboxylic acid or a mixture of such esters, (3) 10%–95% of a total of 1–10 parts by weight of an $a,\beta$-ethylenically unsaturated mono- or dicarboxylic acid or salt thereof, or a monoester of an $\alpha,\beta$-ethylenically unsaturated dicarboxylic acid or salt thereof, or a mixture of any of them, and (4) from 10–80% of a total of 8–50 parts by weight of a copolymerizable mono-vinyl compound different from that of (1), (2), and (3) above; the total of all of said parts being 100; and
 (b) in a second step, emulsion polymerizing polymerization product of the first step with the remainder of monomers (2), (3) and (4).
2. The method of claim 1 wherein:
 (a) a total of from 35–75 parts by weight of monomer (1) are used;
 (b) a total of 2–10 parts by weight of monomer (2) are used;
 (c) a total of from 3–8 parts by weight of monomer (3) are used; and
 (d) a total of 10–45 parts by weight of monomer (4) are used.
3. The method of claim 2 wherein polymerization product of the second step is given a heat treatment at 160° to 210° F. for ½ to 4 hours.
4. The method of claim 2 wherein:
 (a) from 50–90% of monomer (2) is used in the first step;
 (b) from 50–90% of monomer (3) is used in the first step; and
 (c) from 30–60% of monomer (4) is used in the first step.
5. The method of claim 4 wherein:
 (a) monomer (1) is $C_1$–$C_{18}$ alkyl or $C_1$–$C_{18}$ alkoxyalkyl ester of acrylic acid;
 (b) monomer (2) is $C_1$–$C_8$ hydroxy alkyl ester of acrylic or methacrylic acid;
 (c) monomer (3) is methacrylic acid, acrylic acid or itaconic acid; and
 (d) monomer (4) is styrene or $C_1$–$C_5$ alkyl ester of methacrylic acid.
6. The method of claim 4 wherein:
 (a) monomer (1) is ethylacrylate;
 (b) monomer (2) is $\beta$-hydroxypropyl methacrylate;
 (c) monomer (3) is methacrylic acid; and
 (d) monomer (4) is styrene.
7. Product produced by the process of claim 1.
8. Product produced by the process of claim 6.
9. Substrate coated with the cured film obtained by casting a wet film of the product of claim 7 on said substrate and thereafter curing said film.
10. Substrate coated with the cured film obtained by casting a wet film of the product of claim 8 on said substrate and thereafter curing said film.
11. The method which comprises:
 (a) in a first step, emulsion polymerizing a first mixture of monomers consisting essentially of (1) substantially all of a total of 20–90 parts by weight of a hydroxyl-free aliphatic ester of $\alpha,\beta$-unsaturated monocarboxylic acid or a mixture of such esters, (2) 10%–95% of a total of 1–20 parts by weight of a hydroxyl-containing aliphatic ester of $\alpha,\beta$-unsaturated monocarboxylic acid or a mixture of such esters, (3) 10%–95% of a total of 1–10 parts by weight of an $\alpha,\beta$-ethylenically unsaturated mono- or dicarboxylic acid or salt thereof, or a monoester of an $\alpha,\beta$-ethylenically unsaturated dicarboxylic acid or salt thereof, or a mixture of any of them, and (4) from 10%–80% of a total of 8–50 parts by weight of a copolymerizable monovinyl compound different from that of (1), (2), (3) above and selected from the group consisting of styrene, $\alpha$-methyl styrene, vinyl toluene, monochlorostyrene, vinyl acetate, vinyl chloride, vinylidene chloride, alkyl methacrylates in which the alkyl group contains 1–5 carbon atoms, and mixtures thereof; the total of all of said parts being 100; and
 (b) in a second step, emulsion polymerizing polymerization product of the first step with the remainder of monomers (2), (3), and (4).

References Cited
UNITED STATES PATENTS

| | | | |
|---|---|---|---|
| 2,819,237 | 1/1958 | Daniel | 260—29.6 |
| 3,082,184 | 3/1963 | Falgiatore et al. | 260—30.4 |
| 3,208,963 | 9/1965 | Jakinski | 260—29.6 |
| 3,244,655 | 4/1966 | Sullivan et al. | 260—29.6 |
| 3,245,932 | 4/1966 | Glavis et al. | 260—29.4 |

MURRAY TILLMAN, *Primary Examiner.*

J. T. GOOLKASIAN, *Assistant Examiner.*

UNITED STATES PATENT OFFICE
CERTIFICATE OF CORRECTION

Patent No. 3,366,590                                January 30, 1968

David Taft

It is certified that error appears in the above identified patent and that said Letters Patent are hereby corrected as shown below:

Column 3, line 15, "45-107" should read -- 45-10% --.

Signed and sealed this 13th day of January 1970.

(SEAL)
Attest:

Edward M. Fletcher, Jr.
Attesting Officer

WILLIAM E. SCHUYLER, JR.
Commissioner of Patents